United States Patent
Carle et al.

(10) Patent No.: US 6,602,308 B1
(45) Date of Patent: Aug. 5, 2003

(54) AIR FILTER

(75) Inventors: Thomas Carle, Boeblingen (DE);
Volker Greif, Sindelfingen (DE);
Stefan Kochert, Weinstadt (DE);
Bernd Spaeth, Ulm (DE); Klaus Moessinger, Obersulm (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/381,922

(22) PCT Filed: Mar. 12, 1998

(86) PCT No.: PCT/EP98/01411
§ 371 (c)(1),
(2), (4) Date: Dec. 10, 1999

(87) PCT Pub. No.: WO98/42429
PCT Pub. Date: Oct. 1, 1998

(30) Foreign Application Priority Data

Mar. 26, 1997 (DE) .......................................... 197 12 679

(51) Int. Cl.[7] .............................................. B01D 46/24
(52) U.S. Cl. ..................... 55/385.3; 55/482; 55/498; 55/502; 55/510; 55/DIG. 5; 123/198 E; 156/69; 156/294; 156/304.2; 156/304.6; 156/499
(58) Field of Search ............................. 55/385.3, 482, 55/498, 502, 510, 524, 500, 503, 504, 505, 507, 520, DIG. 5; 123/198 E; 95/273; 156/69, 218, 294, 295, 309.6, 304.2, 304.6, 499

(56) References Cited

U.S. PATENT DOCUMENTS

| | | | | |
|---|---|---|---|---|
| 3,013,925 A | * | 12/1961 | Larsen | 156/258 |
| 3,133,847 A | * | 5/1964 | Millington | 156/69 |
| 3,354,012 A | * | 11/1967 | Forman et al. | 156/69 |
| 4,128,251 A | * | 12/1978 | Gaither et al. | 55/502 |
| 5,015,316 A | * | 5/1991 | Ostreicher et al. | 156/69 |
| 5,114,508 A | * | 5/1992 | Miyagi et al. | 156/69 |
| 5,230,760 A | * | 7/1993 | Tanabe | 156/69 |
| 5,332,426 A | * | 7/1994 | Tang et al. | 55/385.3 |
| 5,472,537 A | * | 12/1995 | Friel et al. | 156/69 |
| 5,543,002 A | * | 8/1996 | Brinda et al. | 156/294 |
| 5,665,148 A | * | 9/1997 | Muhlfeld et al. | 55/524 |
| 5,730,769 A | * | 3/1998 | Dungs et al. | 55/502 |
| 5,733,452 A | * | 3/1998 | Whitlock | 55/502 |
| 5,741,421 A | * | 4/1998 | Erdmannsdoerfer et al. | 55/502 |
| 5,873,920 A | * | 2/1999 | Wong et al. | 55/502 |
| 6,149,700 A | * | 11/2000 | Morgan et al. | 55/502 |
| 6,159,261 A | * | 12/2000 | Binder et al. | 55/502 |

FOREIGN PATENT DOCUMENTS

| | | | |
|---|---|---|---|
| EP | 0307234 | * | 3/1989 |
| JP | 59279293 | * | 7/1986 |
| JP | 05329338 | * | 12/1993 |

* cited by examiner

*Primary Examiner*—Duane Smith
*Assistant Examiner*—Minh-Chau T. Pham
(74) *Attorney, Agent, or Firm*—Crowell & Moring LLP

(57) ABSTRACT

A method of making an air filter insert for cleaning the combustion air of an internal combustion engine. The method includes producing the filter insert (21) from a pleated filter medium (33) which is formed into a hollow cylinder, in which at least one end plate (33, 34) made of thermoplastic elastomer or thermoplastic polyurethane is disposed on the axial end faces of the filter medium (33). The at least one end plate (33, 34) is bonded to the cylindrical filter medium (33) by heating the filter medium or the end plate (33, 34) with a high-temperature heating element and fusing the filter medium (33) and the end plate (33, 34) to form a welded joint.

1 Claim, 2 Drawing Sheets

AIR FILTER

BACKGROUND OF THE INVENTION

The invention relates to a filter especially for the combustion air for internal combustion engines.

U.S. Pat. No. 4,720,292 discloses an air filter with the following features,

A housing is provided with an axial outlet opening and a substantially open second end which can be closed by a removable cover. An air inlet opening is provided on the periphery of the housing. In the housing there is a substantially cylindrical filter element with an internal support tube, and a filter with an external support tube, the inner filter element being disposed coaxially in the housing. The sealing of the filter element to the housing is provided by an annular end plate which has a substantially cylindrical surface directed radially inward and is pushed over an inner section of the outlet portion.

As is well known, the filter inserts of air filters are replaced after a certain period of operation. Depending on the amount of dust in the air, the useful life of an air filter may amount to a few days—in construction machines, for example—to several months. The filter insert disclosed in the above referenced filter insert, as well as others commonly used filter inserts, consist of a combination of materials, especially using sheet steel for the support tubes. The filter medium is paper or a synthetic nonwoven material, and the end plates consist of synthetic resin (soft elastomer). The disposal of such air filters or their breakdown into their individual component materials entails great expense and has therefore been uneconomical.

Basically, the avoidance of waste takes precedence over waste recycling and disposal. For the process of recycling, such recycling must be industrially possible, its cost must be reasonable, and a market must be able to exist or be created for the resultant material or energy. Not until these criteria are met can wastes be properly disposed of.

In the case of air filter inserts, recycling has thus far been impossible on account of the above-described disadvantages.

SUMMARY OF THE INVENTION

Another disadvantage of the known state of the art is to be seen in the fact that a relatively large housing is required for the air filter insert, which demands an unnecessarily great amount of space in the clean air area.

It is therefore the object of the invention to provide a filter of metal-free design, which can be disposed of without difficulty and has a very compact construction. This object is achieved by the invention as described and claimed hereinafter.

The core idea of the invention lies in the use of a material that is outstandingly suitable for the end plates of an air filter and thoroughly suitable for combining a filter medium with support structures. One such material is, for example, a thermoplastic elastomer, (or) especially a thermoplastic polyurethane.

Thermoplastic elastomers are materials in which elastomeric phases are bound as soft components into plastics as hard components. Unlike elastomers, thermoplastic elastomers, abbreviated TPE, are crosslinked, not chemically irreversibly but physically reversibly. The reversible crosslinking is produced by their biphasic structure. If the molecular architecture is suitable, the domains of the hard sequences form the physical crosslinking points in a continuous matrix of the soft sequences, which at the same time are selected such that, at the temperature of their use, they are above their glass temperature (freezing temperature). The glass transition temperature (if amorphous) or the melting temperature (if partially crystalline) of the hard sequences must, however, be above the temperatures of use, and thus the domains of the hard sequences can act as crosslinking points. TPE's therefore behave at the temperature of use like elastomers, but above the characteristic equilibrium temperature the hard sequences become mobile and the thermoplastic elastomers can then be worked like thermoplastics.

The great advantage of TPE over vulcanized elastomers lies in its substantially simpler processing which eliminates mastication (oxidative degradation), the admixture of vulcanization accelerators, and in some cases even the compounding, and also, of course, vulcanization.

The thermoplastic polyurethanes are, like all plastics of this family, polyaddition products of polyisocyanates and polyols. Their rubber-like behavior results from the segment-like structure of the macromolecules. Here too a hard segment is combined with a soft segment the thermoplastic polyurethanes are characterized by high flexibility even at low temperatures, durability at high temperatures, great resistance to tearing, great vibration damping ability, and high resistance to fats, oils and solvents, as well as to high-energy radiation and ultraviolet light.

The polar-structure thermoplastic polyurethane resin elastomers can be mixed with other thermoplastics and fabricated together with them.

A further refinement of the invention envisions additionally providing the filter medium with support bodies which can surround the filter medium and thus improve its stability.

In an additional embodiment of the invention at least one end plate is equipped with a sealing system; these end plates can have both an axially directed and a radially directed sealing structure. Preferably the end plate is provided with a concentric collar bearing a radial gasket. Fundamentally it is possible to equip the elements consisting of thermoplastic elastomer or thermoplastic polyurethane with functional structures. Thus, for example, an end plate can be provided with support bodies or with connecting elements.

In a process for the production of the air filter, first a hollow cylindrical pleated element is prepared from a filter medium. The end plates are fused onto the axial end faces of the filter insert with, for example, high-temperature heating elements and bonded to the filter medium. Instead of fusing them with hightemperature temperature heating elements, mirror welding can also be used.

BRIEF DESCRIPTION OF THE DRAWING

These and additional features of preferred embodiments of the invention will be found not only in the claims but also in the description and the drawings, and the individual features can each be realized individually or together in the form of subcombinations in embodiments of the invention and in other fields, and can constitute advantageous as well as independently patentable embodiments, for which protection is hereby claimed.

The invention will be explained below in further detail with reference to a working embodiment.

DETAILED DESCRIPTION OF PREFERRED EMBODIMENTS

Figure 1:
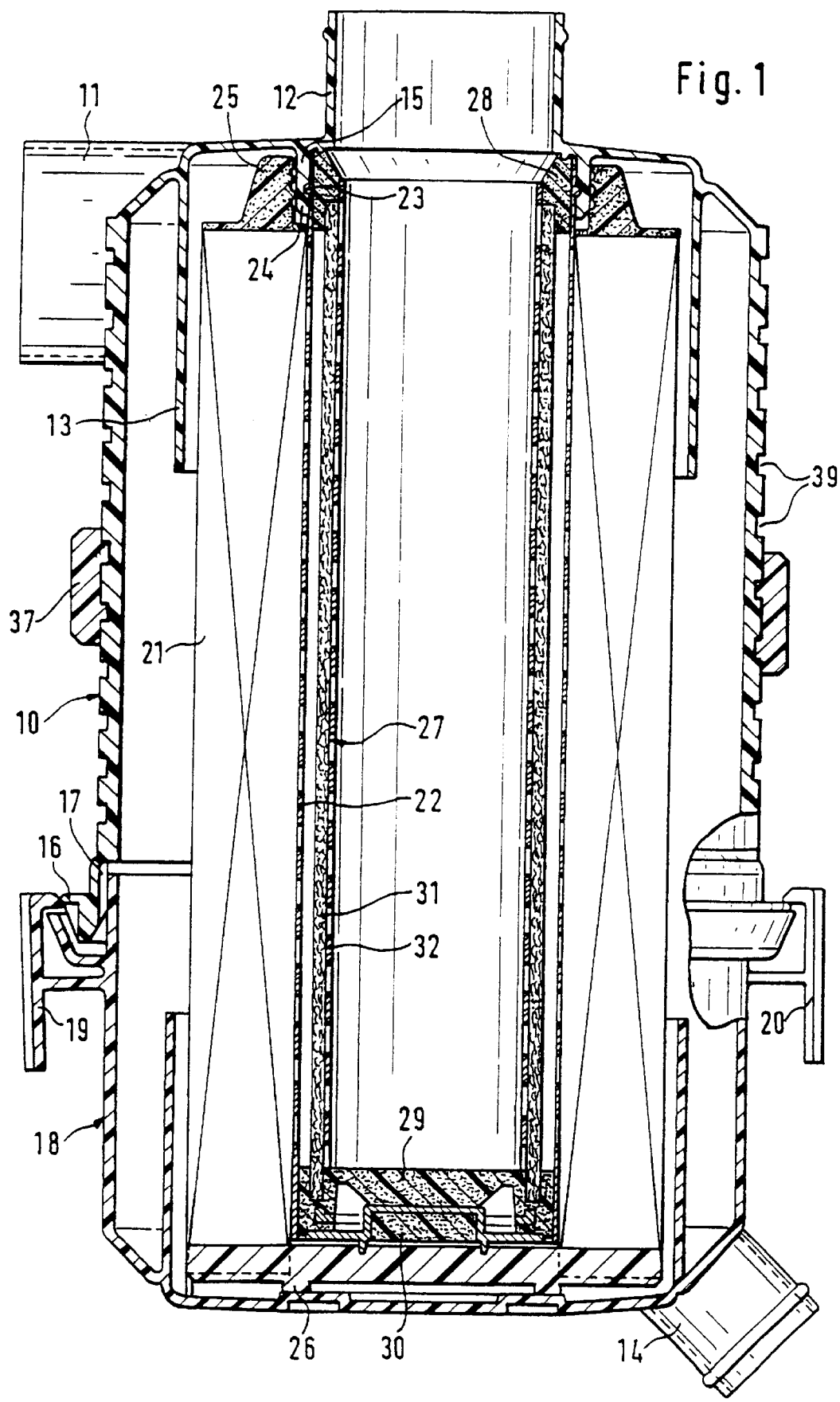
FIG. 1 shows a filter in a sectional view

The filter shown in FIG. 1 is illustrated in two half sections. The left half section shows the filter with a cover still slightly open, while the right half section shows the filter with the cover closed. The filter is comprised of a cylindrical housing 10 with a raw air inlet 11 and a clean air outlet 12. In the area of the raw air inlet a deflector wall 13 (immersion tube) is provided. In conjunction with the raw air inlet which introduces [air] tangentially into the housing 10 a swirling flow of raw air is formed. This causes a separation of coarse dust particles, whereupon the coarse dust particles pass downwardly along the inside wall of the filter and are carried into the open through a dust discharge opening 14 which is closed by a known dust discharge valve.

A useful configuration of a filter is to be seen in the fact that the central tube is affixed to the housing. Since the central tube is not subject to wear and tear, replacement is unnecessary. In a useful manner, this central tube, which in particular is formed of synthetic resin material, is interlockingly attached to the connecting tube of the housing.

In accordance with one embodiment of the connection of the central tube to the connecting tube, the central tube has sealing lips which are disposed in the vicinity of the connection and assure a reliable seal.

The housing 10 is furthermore provided with a connecting tube 15 and with a circumferential catch projection 16 and a cylindrical receptacle 17 for a cover 18. The cover 18 is pot-shaped and has at least two catch elements 19 and 20. These catch elements are pivotably attached to the cover by so-called flex hinges and are made of synthetic resin material together with the cover in a single operation. They engage via the catch projection 19 of housing 10. In the left section of FIG. 1 the catch element 19 is shown in the open position. In the right section, i.e. in the cut-away view, the catch element 20 is illustrated in the closed position.

A metal or synthetic resin central tube 22 is fastened to the connecting tube 15 of housing 10. For a positive attachment of this central tube the latter is provided with a bead 23 which snaps into a groove 24 of the connecting tube. Unintentional removal of the central tube is thus no longer possible.

A filter insert 21 is pushed over the central tube 22. This filter insert carries on its upper end surface a radial gasket which forms a unit with the end plate 40 of the filter insert. This radial gasket is comprised of a circumferential collar 25 lying outside of the plane of the filter. The collar 25 sealingly encloses the connecting tube 15. With this type of seal, any axial change in the position of the filter insert is of no consequence. Moreover, this kind of seal is extremely reliable even in case of shaking and vibration.

The filter insert 21 is supported at its rearward end by buttons 26 against the cover 18. These buttons, which can also be configured as deformable ribs, serve for the axial fixation of the filter insert and for damping vibrations of the cartridge disposed only on the central tube 22 in the rear area. A secondary element 27 is disposed inside of the central tube 22. This secondary element is provided at its front end with a polyurethane resin foam end surface gasket 28. This end surface gasket is interlockingly connected to the connecting tube 15. The rear end of the secondary element 27 is provided with a polyurethane resin foam end face gasket 29. A plastic grip is integrated into this end gasket 29 and serves for manual removal of the secondary element. The secondary element advantageously is composed of a nonwoven material 31 which is pushed onto a support tube 32. The axial force for sealing the secondary element on the clean air outlet is applied to the end gasket 29 through the cover 18 and the buttons 26 of the filter insert 21.

Since the secondary element 27 is completely surrounded by the central tube 22, there is no danger that, when the filer insert is being replaced, the secondary element will accidentally be removed or fall out.

In assembling the entire filter, first the secondary element is inserted, then the filter insert 21 is pushed over it and the cover 18 installed. Since the secondary element is supported on the filter insert 21 at the rear end, and at the same time the filter insert 21 is supported on the cover 18, when the cover is installed, it brings the two elements into their correct position. This means that erroneous installation of the two elements is not possible. The end position of these elements is attained when the cover 18 is locked onto the receptacle 17.

The metal-free secondary element can be disposed of without any problems. For example, the nonwoven material, the polyurethane resin foam end plates, and the synthetic resin central tube and grip can be disposed of thermally.

Because the filter insert 21 has an end gasket at both end faces, it is easily possible to knock this filter insert out and free it of the dirt coating. The elastic end plates are not damaged thereby, as would be the case with sheet-metal end plates.

Figure 2:
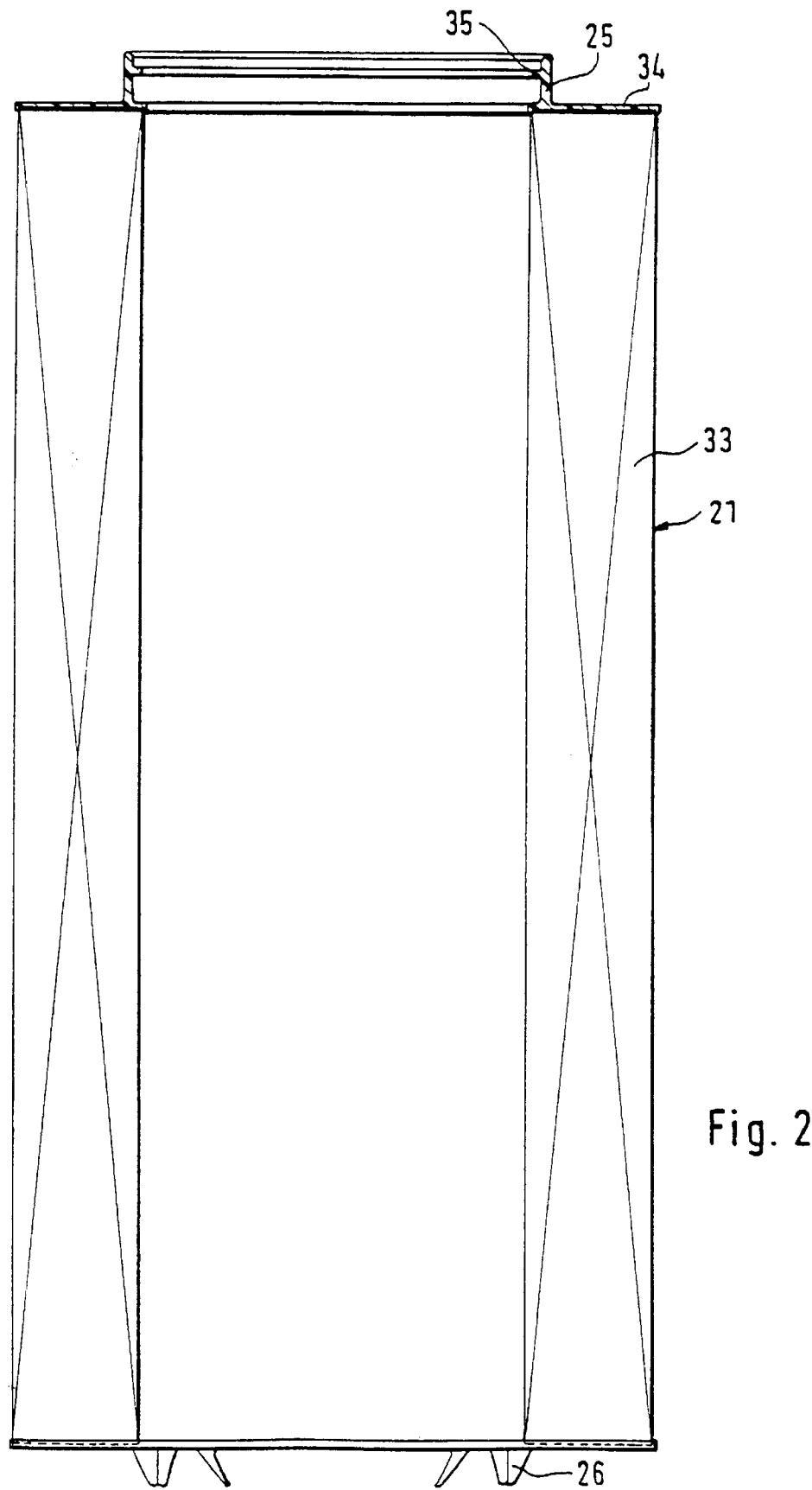
FIG. 2 shows a detail view of a filter insert

FIG. 2 shows a detailed view of the filter element. The filter element 21 comprises a pleated filter medium 33, which can be provided on its inner or outer periphery with a support body. It is also possible to construct the filter element 21 to be self-supporting; this is the case with the element which is shown. An end plate 34 composed of a thermoplastic elastomer or thermoplastic polyurethane is arranged on the end facing the clean air outlet. This end plate bears a bead 25 lying outside of the filter plane. This in turn is provided with a sealing ring element 35, which is composed of the material of the end plate. Due to the elasticity of the material a reliable seal is achieved between the raw air side and clean air side in the installed state. Of course, it is also possible to arrange several annular sealing elements on the bead 25. On the side opposite the clean air outlet the filter insert 21 is provided with a closed end plate 36. This also is composed of a thermoplastic elastomer or of a thermoplastic polyurethane and carries several buttons or supporting elements 26.

To assemble the filter insert 21 together, the end plates 34 and 36 are heated, for example by heating element welding, on the side facing the filter medium 33, and after sufficient heating they are pressed onto the filter medium. Due to the precisely defined local heating, the depth of penetration of the filter medium into the respective end plate can be determined very precisely. It is thereby also possible to compensate for any existing length tolerances of the filter medium.

Due to the structure of thermoplastic elastomer or thermoplastic polyurethane that has been described above, the amount of material in the end plates is extremely small, resulting in a considerable cost saving; also, lower costs are involved in the disposal of the filter insert 21.

What is claimed is:

1. A method of making an air filter insert comprising the steps of forming a pleated filter medium into a hollow cylindrical shape and disposing two end slates of thermoplastic elastomer or thermoplastic polyurethane on respective axially directed end faces of the cylinder of filter medium, and bonding the end plates to the cylinder of filter medium by heating the filter medium or the end plates with a high-temperature heating element and fusing the filter medium and the end plates together to form a welded joint, wherein one of the end plates comprises a circumferential collar forming a radial seal for separating a raw air inlet side from a clean air outlet side of the air filter insert and the other end plate comprises supporting buttons or ribs for axially supporting the air filter insert, wherein the bonding together of the end plates and the filter medium is effected by mirror welding.

* * * * *